Figure 1:
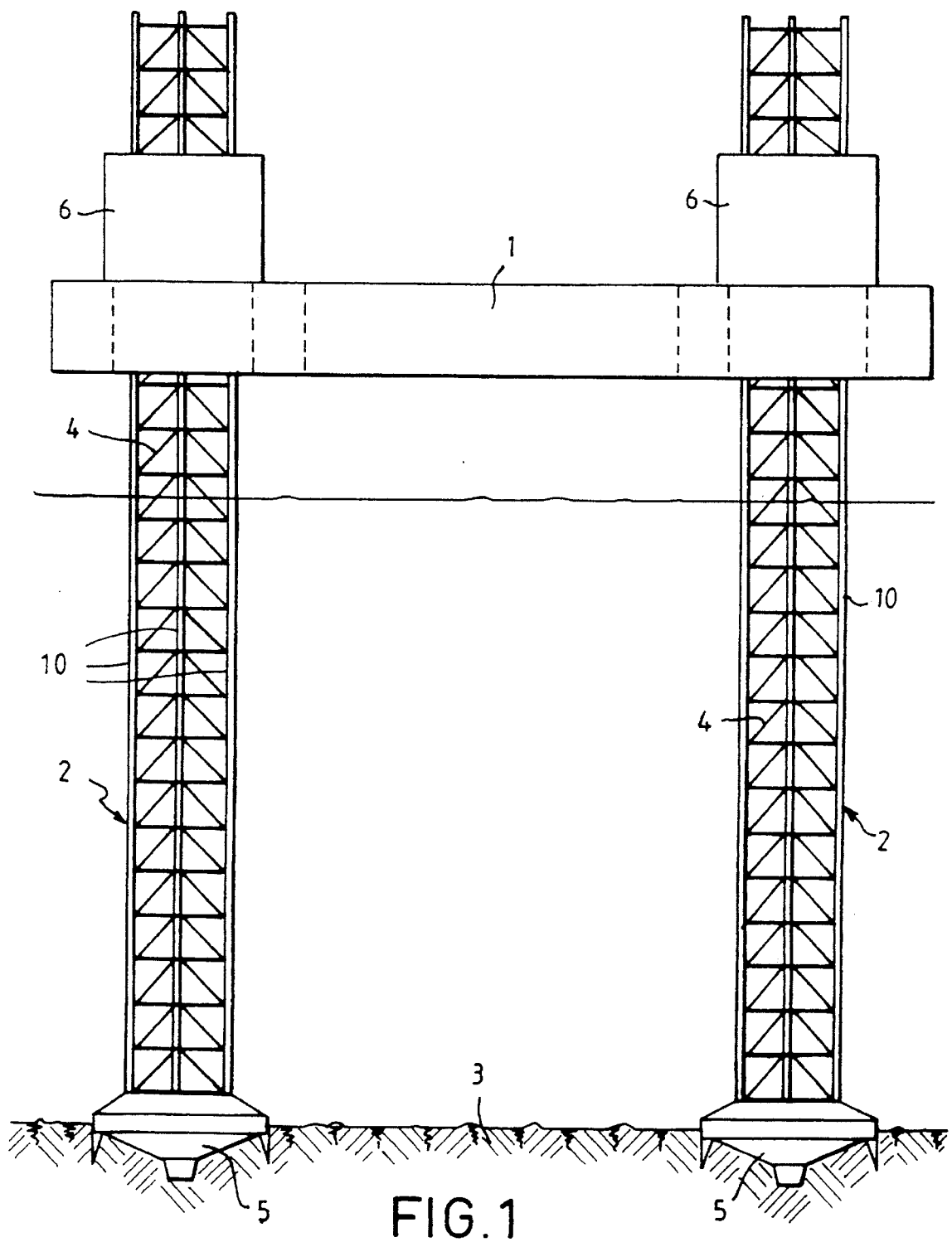

United States Patent [19]

Thomas et al.

[11] Patent Number: 5,607,259

[45] Date of Patent: Mar. 4, 1997

[54] PROCESS FOR ASSEMBLING LONG SECTIONS OF BOOMS OF SUPPORT LEGS OF AN OIL PLATFORM

[75] Inventors: Pierre-Armand Thomas, Puteaux; Jean-Claude Naudin, Paris, both of France

[73] Assignee: Technip Geoproduction, Paris La Defense, France

[21] Appl. No.: 503,724

[22] Filed: Jul. 18, 1995

[30] Foreign Application Priority Data

Jul. 19, 1994 [FR] France ................................. 94 08922

[51] Int. Cl.⁶ .................................................. E02B 17/00
[52] U.S. Cl. ................. 405/198; 29/897.31; 219/121.14; 228/171
[58] Field of Search ..................... 405/198, 196; 409/132, 64, 65; 29/897, 897.3, 897.31, 558; 219/121.13, 121.14; 228/171, 189

[56] References Cited

U.S. PATENT DOCUMENTS

| Re. 32,589 | 2/1988 | Goldman et al. ....................... 405/198 |
| 3,857,150 | 12/1974 | Faucheux ............................. 29/897.31 |
| 3,967,457 | 7/1976 | Lovie . | |
| 4,000,952 | 1/1977 | Bryan et al. . | |
| 4,163,402 | 8/1979 | Bykhovsky et al. .................. 409/64 X |
| 4,627,768 | 12/1986 | Thomas et al. ......................... 405/198 |
| 4,801,125 | 1/1989 | Kocher ........................... 219/121.13 X |
| 5,445,309 | 8/1995 | Yamada et al. ..................... 228/171 X |

FOREIGN PATENT DOCUMENTS

| 28926 | 9/1931 | Australia ................................ 228/171 |
| 0520854 | 12/1992 | European Pat. Off. . | |
| 1225617 | 7/1960 | France . | |
| 2560247 | 8/1985 | France . | |
| 2135667 | 1/1973 | Germany . | |
| 0096319 | 6/1984 | Japan ................................... 405/198 |
| 0228514 | 12/1984 | Japan ................................... 405/198 |

*Primary Examiner*—Dennis L. Taylor
*Attorney, Agent, or Firm*—Wenderoth, Lind & Ponack

[57] ABSTRACT

The process for assembling long sections (11) of booms of support legs of an oil platform comprises machining an inclined flat surface (15) on the whole of the length of each main face of a rectangular plate (12), machining a groove behind each flat surface (15), machining an inclined chamfer on longitudinal edges of a stiffener (13), placing a stiffener (13) on each main face of the rectangular plate (12), welding each stiffener (13) to the rectangular plate (12), under a vacuum from the exterior by means of an electron beam, in the region of the chamfers and the flat surfaces so as to produce a section (11), and heat treating the section (11).

11 Claims, 4 Drawing Sheets

PROCESS FOR ASSEMBLING LONG SECTIONS OF BOOMS OF SUPPORT LEGS OF AN OIL PLATFORM

The present invention relates to a process for assembling long sections of booms of support legs of an offshore oil drilling or producing platform.

Oil platforms, and in particular jack-up platforms, comprise legs which rest on the sea bed and a hull which is mounted to be movable and adjustable in height along the legs.

The whole of the platform is floated to the drilling or production site and the legs are lowered into contact with the sea bed, then, by bearing against the legs, the hull is raised above the level of the sea to a height which puts it out of range of the highest waves.

Each leg is constituted by vertical booms, three in number, interconnected by a lattice of metal girders.

Each boom is constituted by sections which are welded end to end and are each formed, on one hand, by a rectangular plate and, on the other hand, by stiffeners in the form of a semi-shell each welded to one of the main faces of said plate.

Usually each section has a length of between 12 and 20 metres.

The rectangular plates comprise on their lateral faces or edges teeth which form, in a part of the length of the booms, diametrically opposed racks adapted to cooperate with output gear pinions of drive mechanisms mounted on the hull of the platform.

Each stiffener welded to one of the main faces of the rectangular plates has a length which is less than the length of the plate so as to form at each end of the plate an empty space allowing the sections to be welded end to end when assembling the boom.

To ensure the continuity of the stiffeners, a connecting member in the form of a semi-shell and having a profile corresponding to the profile of the stiffeners is positioned in the region of each empty space and in the extension of said stiffeners after the end-to-end welding of the sections of the boom.

This arrangement permits placing end to end and directly welding on the site the sections of the boom which were previously manufactured in the workshop.

These booms, which support the hull of the platform, are subjected to high fatigue stresses and the weld beads, in particular those welding the stiffeners to the rectangular plates are also subjected to high stresses.

Heretofore, the stiffeners were welded to the main faces of the rectangular plates by conventional welding processes such as for example processes employing an automatic welding under a flux.

Now, with these welding techniques, the weld beads are liable to exhibit connecting defects more particularly in the region of the roots of said weld beads, i.e. inside the stiffeners in the regions of connection to the rectangular plates.

These defects constitute risks of stress corrosion and form regions of concentration of the stresses which are incompatible with the high fatigue stresses to which the legs of oil platforms are subjected.

An object of the invention is to avoid these drawbacks by providing an assembling process which improves the behaviour of the booms in service and the quality of the welds and controls the deformations while reducing the manufacturing costs.

The invention provides a process for assembling long sections of booms of support legs of an oil platform, each section comprising, on one hand, a rectangular plate provided on each of its lateral edges with teeth constituting a rack and, on the other hand, at least one stiffener in the form of a semi-shell fixed to each main face of said rectangular plate, characterized in that it comprises:

machining on the whole of the length of each main face of the rectangular plate and on each side of the longitudinal axis of said rectangular plate a flat surface which is inclined in the direction toward said longitudinal axis, each flat surface being spaced from said longitudinal axis a distance substantially corresponding to the radius of curvature of the stiffener, machining a groove along the whole of the length of the rectangular plate and behind each flat surface relative to the longitudinal axis of said rectangular plate, machining on the longitudinal edges of each stiffener a chamfer which is inclined in the direction toward the axis of said stiffener and which has an angle of inclination substantially equal to the angle of inclination of the corresponding flat surface, placing the stiffener on each main face of the rectangular plate in such manner that the chamfer of the longitudinal edges of said stiffener bears against a flat surface of said rectangular plate, welding each stiffener, under a vacuum and from the exterior by means of an electron beam, to the rectangular plate in the region of the chamfers and of the flat surfaces so as to form a boom section, and carrying out a heat treatment on the boom section.

According to other features of the invention:

each stiffener is formed by a plurality of elements placed end to end and welded together, the angle of inclination of the flat surfaces and of the chamfers is between 5° and 30° and preferably between 10° and 15°, the heat treatment comprises hardening followed by a tempering of the section, before the heat treatment, the section is heated to a temperature of the order of 1,000° C. for the hardening, the tempering of the section is carried out at a temperature of the order of 600° C., the heat treatment comprises a tempering of the section, the tempering of the section is carried at a temperature of the order of 625° C., before carrying out the heat treatment of the section there is effected from the interior of each stiffener a remelting of the root of the weld beads, the remelting of the root of the weld beads is effected by a gas-shielded arc welding process with a refractory electrode.

Figure 2:
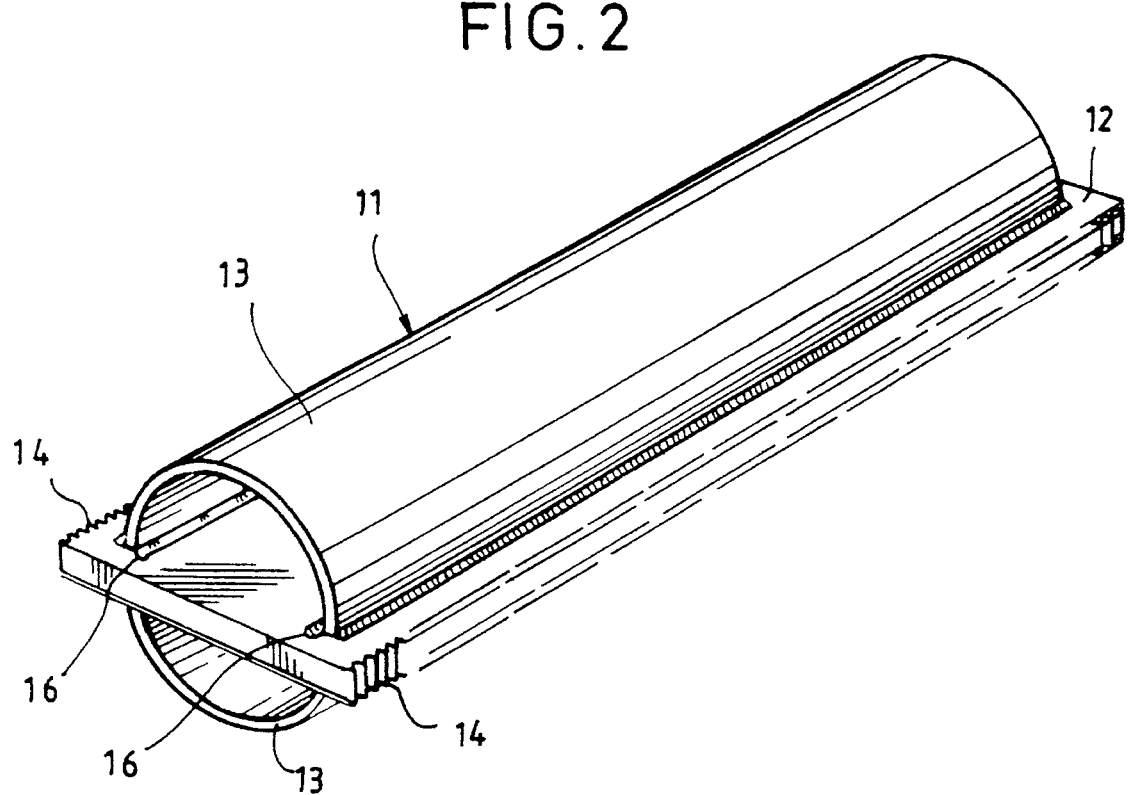
Figure 3:
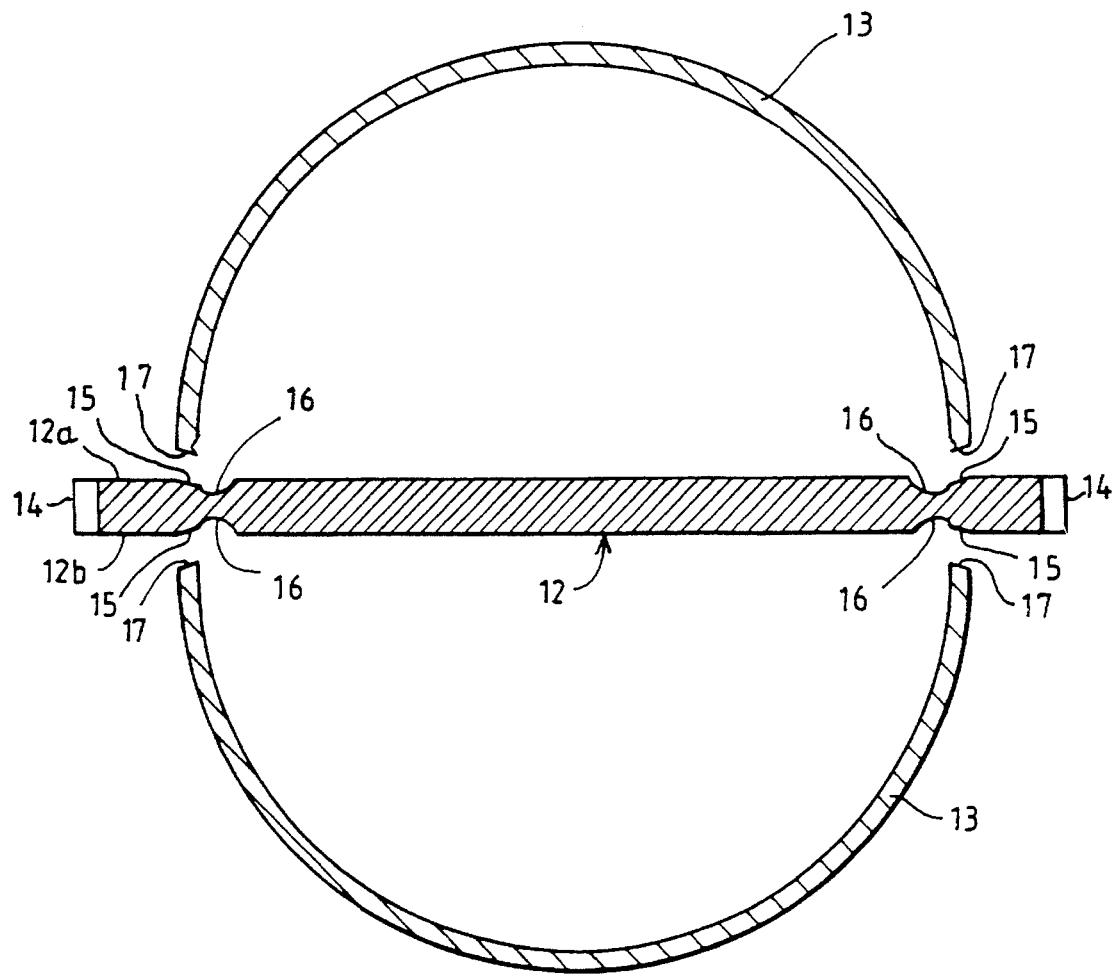
Figure 4:
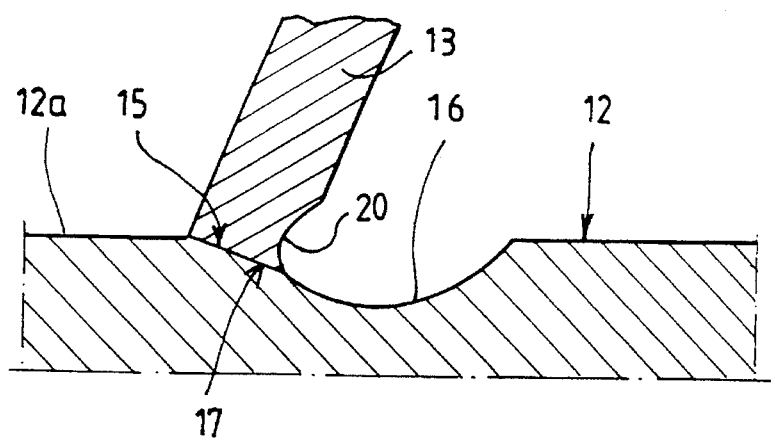
Figure 5:
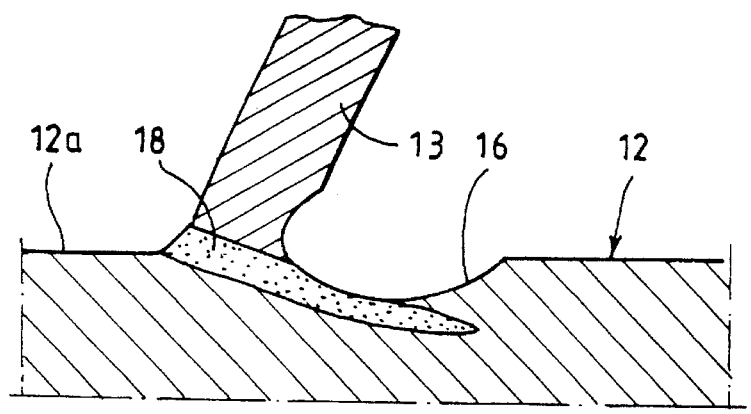
Figure 6:
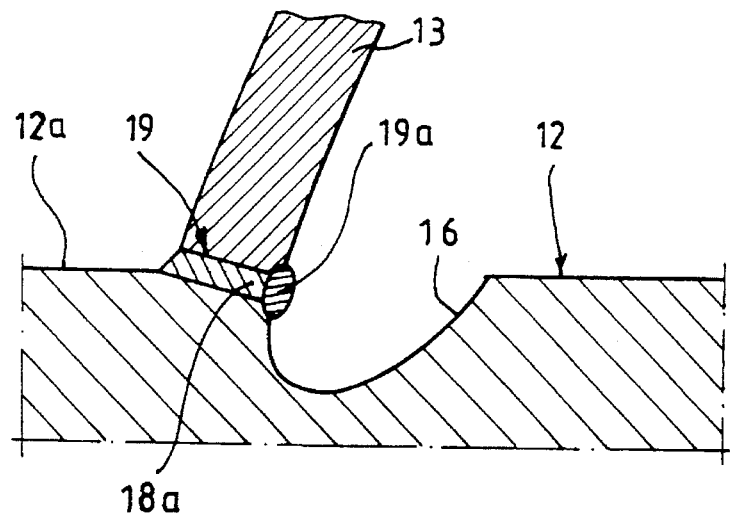

A better understanding of the invention will be had from the following description which is given solely by way of example with reference to the accompanying drawings, in which:

FIG. 1 is a diagrammatic elevational view of an oil platform, for example of the jack-up type, FIG. 2 is a diagrammatic perspective view of a section of a boom of a support leg made by means of the process according to the invention, FIG. 3 is a diagrammatic cross-sectional view of a rectangular plate and two stiffeners before these elements have been assembled, FIG. 4 is a diagrammatic cross-sectional view to a larger scale showing a region of connection between a rectangular plate and a stiffener, FIG. 5 is a diagrammatic cross-sectional view of a weld bead of a rectangular plate and of a stiffener according to a first manner of carrying out the invention, FIG. 6 is a diagrammatic cross-sectional view of a region of connection between a rectangular plate and a stiffener according to a second manner of carrying out the invention.

Diagrammatically shown in FIG. 1 is a jack-up oil platform comprising a hull 1 mounted to be movable along vertical legs 2 adapted to rest on the sea bed 3 when the platform is in the drilling or production position.

Each of the vertical legs 2 has, in the presently-described embodiment, a triangular cross-sectional shape and is constituted by three booms or posts 10 which are interconnected by a lattice structure of metal girders 4.

Each leg 2 terminates in its lower part in a foot 5.

The platform is moreover provided in the region of each leg 2 with a mechanism 6 for driving and suspending the hull relative to said legs 2.

The driving mechanisms permit lowering the legs 2 into contact with the sea bed, then, by bearing against the legs, raising the hull 1 above the level of the sea to a height which puts it out of range of the highest waves.

As shown in FIG. 2, each boom 10 of the legs 2 comprises a plurality of sections 11 of great length, of the order of 12 to 20 metres.

Each section 11 is constituted by a rectangular plate 12 and two stiffeners 13 in the form of a semi-shell, each of which is welded to a main face of said rectangular plate 12.

The lateral edges or faces of the rectangular plates 12 comprise teeth 14 which form on the boom 10 two diametrically opposed racks adapted to cooperate with output gear pinions (not shown) of the driving mechanisms 6.

With reference to FIGS. 3 to 6, there will now be described the assembly of a section 11 of a boom 10 by means of the process according to the invention.

As shown in FIG. 3, the process comprises first of all machining, along the whole of the length of each main face 12a and 12b of the rectangular plate 12 and on each side of the longitudinal axis of the rectangular plate, a flat surface 15 which is inclined in the direction toward said longitudinal axis.

The rectangular plate 12 consequently comprises, on each of its main faces 12a and 12b, two flat surfaces 15 which are diametrically opposed and extend throughout the length of the rectangular plate 12.

Each flat surface 15 is spaced from the longitudinal axis of the rectangular plate 12 a distance substantially corresponding to the radius of curvature of the stiffener 13.

Thereafter, a groove 16 is machined on the whole of the length of the rectangular plate and behind each flat surface 15 relative to the longitudinal axis of the rectangular plate 12.

A chamfer 17 is machined on the longitudinal edges of each stiffener 13. Each chamfer 17 is inclined in a direction toward the axis of the stiffener 13 at an angle which is substantially equal to the angle of inclination of the flat surfaces 15 machined on each main face 12a and 12b of the rectangular plate 12.

The angle of inclination of the flat surfaces 15 and of the chamfers 17 is between 5° and 30° and preferably between 10° and 15°.

As shown in FIGS. 4 and 5, the inner surface of the stiffener 13 comprises, just above each flat surface 15, a groove 20 which extends along the whole of the length of said stiffener 13.

To assemble the stiffeners 13 with the rectangular plate 12, each stiffener 13 is placed on the corresponding main face 12a or 12b of the rectangular plate 12 in such manner that the chamfer 17 of the longitudinal edges of each stiffener 13 bears against a flat surface 15 of the rectangular plate 12, as shown in FIG. 4.

After this operation, the assembly consisting of the stiffeners 13 and the rectangular plate 12 is placed in a vacuum in an enclosure (not shown), and each stiffener 13 is welded from the exterior by means of an electron beam to the rectangular plate 12 in the region of the flat surfaces 15 and the chamfers 17 so as to produce, in each region of connection between the stiffeners 13 and the rectangular plate 12, a weld bead 18 such as that shown in FIG. 5.

The inclination of the flat surfaces 15 and of the chamfers 17 enables the electron beam to be inclined, which facilitates the welding.

As shown in FIG. 5, the weld bead 18 penetrates the rectangular plate 12 and this ensures a progressive transition of the form and of the forces between the rectangular plate 12 and the stiffeners 13.

The last operation comprises a heat treatment of the boom section 11.

In a first manner of carrying out the invention, the heat treatment comprises a hardening followed by a tempering of the section 11.

To this end, the section 11 is heated to a temperature of the order of 1,000° C., and hardened by quenching in a tank for example filled with water.

After this hardening operation, the section 11 is tempered at a temperature of the order of 600° C.

In a second manner of carrying out the invention, the heat treatment comprises a tempering of the section 11. This tempering is carried out at a temperature of the order of 625° C.

This heat treatment permits achieving a continuity between the metal of the stiffeners 13 and the metal of the rectangular plate.

In this way, the welded region has mechanical properties substantially identical to those of the metal of the stiffeners 13 and of the rectangular plate 12.

In an alternative manner of carrying out the invention, each stiffener 13 may be made up of a plurality of elements placed end to end and welded together.

The sections 11 constructed in this way are then welded end to end by conventional means so as to form a boom 10.

In an embodiment shown in FIG. 6, the grooves 16 are deeper than in the foregoing embodiment and, in this case, there is effected, from the interior of each stiffener 13, a remelting of the root 18a of the weld beads 18, for example by means of a gas-shielded arc welding process with a refractory electrode.

For this purpose, suitable tooling is employed which travels inside each stiffener 13 and along each weld bead 18 on the rectangular plate 12.

In this way there is obtained a weld bead 19 including a remelting 19a of the root 18a, as shown in FIG. 6.

The grooves 16 permit effecting the remelting 19a and provide a progressive transition of the shape and of the forces between the rectangular plate 12 and the stiffeners 13.

The last operaton comprises a heat treatment by quenching, for example in water, followed by a tempering of the boom section 11.

The assembling process according to the invention improves the performance of the booms in service and in particular the behaviour under fatigue stress, the resistance to corrosion and the resistance to corrosion-fatigue.

This process also improves the quality of the welds and eliminates regions of concentration of the stresses which are incompatible with the high fatigue stresses to which legs of oil platforms are subjected, while it reduces the manufacturing costs of these legs by the automation of the assembling process.

What is claimed is:

1. Process for assembling long sections of booms of support legs of an oil platform, each section comprising in combination when assembled: a rectangular plate provided on each of lateral edges thereof with teeth constituting a rack, and at least one stiffener substantially in the form of a semi-shell fixed on each main face of said rectangular plate, said process comprising the following steps:

machining on the whole of the length of each main face of said rectangular plate and on each side of a longitudinal axis of said rectangular plate a flat surface inclined in a direction toward said longitudinal axis, each flat surface being spaced from said longitudinal axis a distance substantially corresponding to the radius of curvature of said stiffener, machining a groove on the whole of the length of said rectangular plate and behind said flat surface relative to said longitudinal axis of said rectangular plate, machining on longitudinal edges of each stiffener a chamfer which is inclined in a direction toward a longitudinal axis of said stiffener, the angle of inclination of said chamfer being substantially equal to the angle of inclination of a respective one of said flat surfaces, placing said stiffener on each main face of said rectangular plate in such manner that said chamfer of said longitudinal edges of said stiffener bears against the respective flat surface of said rectangular plate, welding each stiffener, under a vacuum and from the exterior by means of an electron beam, to said rectangular plate in the region of said chamfers and flat surfaces so as to form a boom section, and heat treating said section.

2. Process according to claim 1, wherein each stiffener comprises a plurality of elements placed end to end and welded together.

3. Process according to claim 1, wherein said angle of inclination of said flat surfaces and of said chamfers is between 5° and 30°.

4. Process according to claim 1, wherein said angle of inclination of said flat surfaces and of said chamfers is between 10° and 15°.

5. Process according to claim 1, wherein said heat treatment comprises hardening said section and then tempering said section.

6. Process according to claim 5, comprising heating said section to a temperature of substantially 1,000° C. for said hardening before said heat treatment.

7. Process according to claim 5, comprising tempering said section at a temperature of substantially 600° C.

8. Process according to claim 1, wherein said heat treatment comprises tempering said section.

9. Process according to claim 8, wherein said tempering is carried out at a temperature of substantially 625° C.

10. Process according to claim 1, comprising, before carrying out said heat treatment of said section, effecting from the interior of each stiffener a remelting of the root of weld beads produced by said welding.

11. Process according to claim 10, comprising effecting said remelting of said root of said weld beads by a gas-shielded arc welding process with a refractory electrode.

* * * * *